(12) United States Patent
Umeda et al.

(10) Patent No.: US 7,176,156 B2
(45) Date of Patent: Feb. 13, 2007

(54) ELECTRONIC DEVICE, DIELECTRIC CERAMIC COMPOSITION AND THE PRODUCTION METHOD

(75) Inventors: Yuji Umeda, Chuo-ku (JP); Akira Sato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 77 days.

(21) Appl. No.: 10/988,556

(22) Filed: Nov. 16, 2004

(65) Prior Publication Data

US 2005/0107241 A1 May 19, 2005

(30) Foreign Application Priority Data

Nov. 19, 2003 (JP) .............................. 2003-388880

(51) Int. Cl.
*C04B 35/468* (2006.01)

(52) U.S. Cl. ...................................... 501/138; 501/139

(58) Field of Classification Search ................ 501/137, 501/138, 139

See application file for complete search history.

(56) References Cited

U.S. PATENT DOCUMENTS

| | | | | |
|---|---|---|---|---|
| 5,017,534 A | * | 5/1991 | Chaput et al. .............. | 501/134 |
| 5,659,456 A | * | 8/1997 | Sano et al. ............... | 361/321.4 |
| 6,225,250 B1 | * | 5/2001 | Wada et al. ................ | 501/137 |
| 6,344,427 B1 | * | 2/2002 | Komatsu et al. ............ | 501/138 |
| 6,524,983 B2 | * | 2/2003 | Kawamoto et al. ......... | 501/138 |
| 6,556,422 B2 | * | 4/2003 | Kim et al. ............... | 361/321.2 |
| 6,710,000 B2 | * | 3/2004 | Kawamoto et al. ......... | 501/139 |

FOREIGN PATENT DOCUMENTS

JP   A 2001-316176   11/2001

* cited by examiner

*Primary Examiner*—Karl Group
(74) *Attorney, Agent, or Firm*—Oliff & Berridge, PLC

(57) ABSTRACT

A production method of a dielectric ceramic composition having a step of firing dielectric material including a main component ingredient and a subcomponent ingredient, wherein said main component ingredient before firing is barium titanate ingredient powder having the perovskite type crystal structure expressed by $ABO_3$, and a ingredient powder having a ratio A/B of A site components and B site components of $1.006 \leq A/B \leq 1.035$ and the specific surface area of 8 to 50 $m^2/g$ is used. According to the invention, a dielectric ceramic composition having preferable electric characteristics and temperature characteristic can be provided even in the case of being composed of fine particle and a capacitor made to be a thin layer.

3 Claims, 3 Drawing Sheets

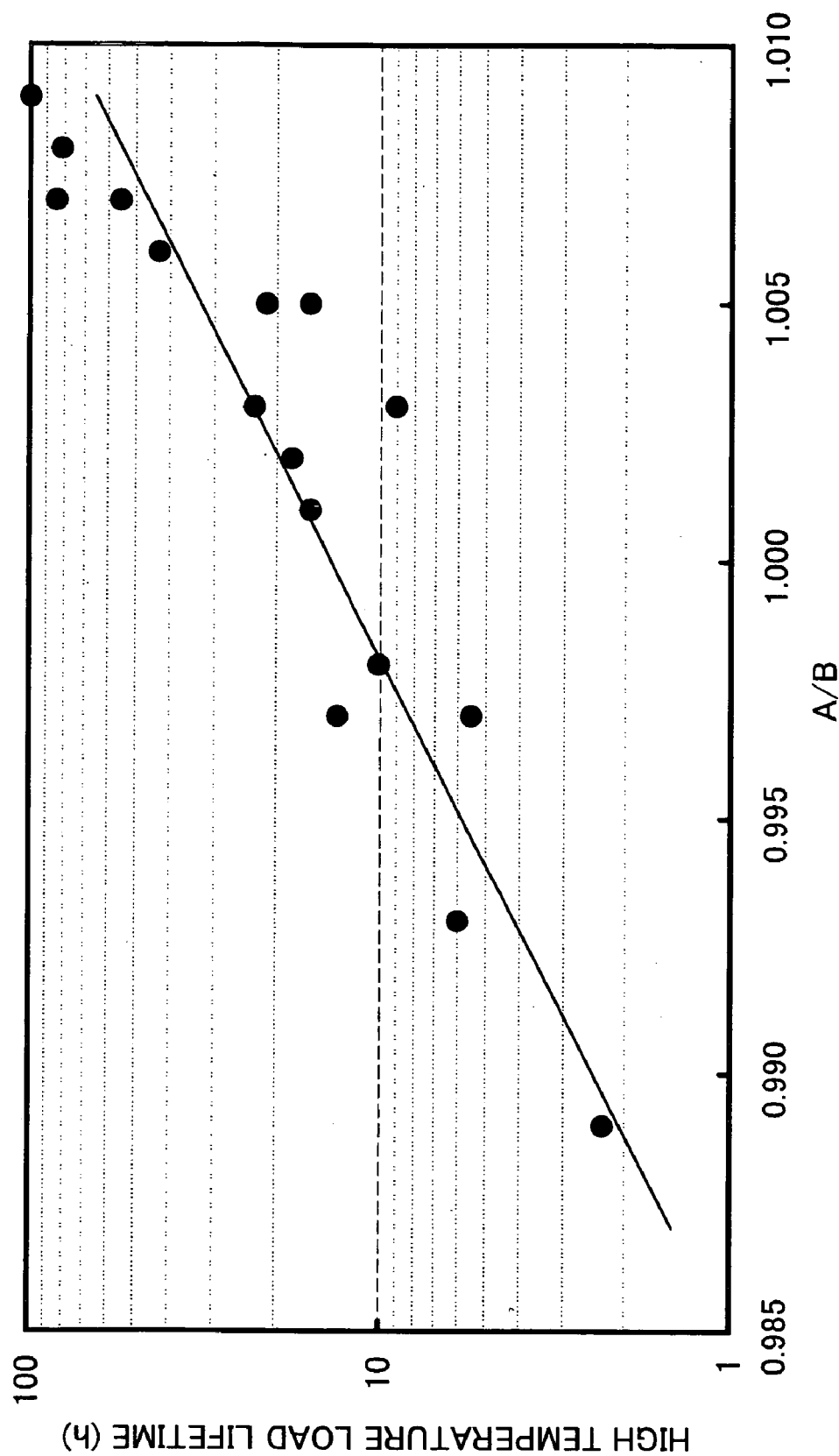

ELECTRONIC DEVICE, DIELECTRIC CERAMIC COMPOSITION AND THE PRODUCTION METHOD

BACKGROUND OF THE INVENTION

1. Field of the Invention

The present invention relates to a production method of a dielectric ceramic composition used as a dielectric layer of, for example, a multiplayer ceramic capacitor, a dielectric ceramic composition obtained by the production method, and an electronic device using the dielectric ceramic composition as a dielectric layer.

2. Description of the Related Art

A multilayer ceramic capacitor as an example of electronic devices is produced, for example, by alternately stacking ceramic green sheets made by a predetermined dielectric ceramic composition and internal electrode layers of a predetermined pattern and unifying the result, and cofiring a thus obtained green chip. It is necessary that a material which does not react with a ceramic dielectric is selected for the internal electrode layer of the multilayer ceramic capacitor so as to be unified with the ceramic dielectric by firing. Therefore, costly precious metals, such as platinum and palladium, had to be used as the material composing the internal electrode layer.

However, in recent years, a dielectric ceramic composition wherein an inexpensive base metal, such as nickel and copper, can be used has been developed and a major cost reduction has been realized.

Also in recent years, a demand for a more compact electronic device has become high along with an electronic circuit becoming high-density, and a multilayer ceramic capacitor has been rapidly become more compact and higher in capacity. To respond thereto, it has been essential to make a thickness of one dielectric layer thinner in a multilayer ceramic capacitor. However, when a dielectric layer is made thinner, there arises a disadvantage that a short-circuiting defective is frequently caused. As one method to solve the disadvantage, there is a method of making dielectric particles composing the dielectric layer finer. However, in terms of improving characteristics of the multilayer ceramic capacitor, it is necessary not only to make the dielectric particles simply finer, but to maintain preferable electric characteristics also when made to be finer.

In the Japanese Unexamined Patent Publication No. 2001-316176, fine dielectric particle (dielectric ceramic particle) having preferable electric characteristics is obtained by using particles having fine particle diameter as barium titanate base ingredient powder as a main component ingredient, and limiting the maximum particle diameter and the particle distribution. It is disclosed that the DC bias characteristic of the multilayer ceramic capacitor can be made preferable by using the dielectric particle as a dielectric layer of the multilayer ceramic capacitor.

The ceramic multilayer ceramic capacitor described in the above article, particularly the multilayer ceramic capacitor disclosed in the examples is added an extremely large amount of subcomponents, such as Mn and Mg, in the dielectric particles composing the dielectric layer. By adding a large amount of Mn and Mg, etc. as such, dielectric particles can be made finer, but a decline of electric characteristics, for example, a decline of insulation resistance, etc. is caused at the same time. In the multilayer ceramic capacitor in the article, there is no problem caused since a thickness of the dielectric layer is made to be 30 μm, but when the dielectric layer is made thinner to, for example, 5 μm or less, an increase of the insulation defective occurrence rate caused by a decline of insulation resistance as above and deterioration of high temperature load lifetime are inevitable.

SUMMARY OF THE INVENTION

An object of the present invention is to provide a production method of a dielectric ceramic composition having preferable electric characteristics and temperature characteristics even when it is used as a dielectric layer of a multilayer ceramic capacitor and the capacitor is made thinner by being composed of fine particles, and a dielectric ceramic composition having preferable electric characteristics and temperature characteristics. Another object of the present invention is to provide an electronic device, such as a highly reliable multilayer ceramic capacitor produced by such a dielectric ceramic composition and having preferable electric characteristics and temperature characteristics. Particularly, an object of the present invention is to provide an electronic device, such as a multilayer ceramic capacitor, able to be made thinner, compact and made to have multilayer.

The inventors of the present invention have been committed themselves to study a production method of a ceramic composition having preferable electric characteristics and preferable temperature characteristic to satisfy the B characteristic of the JIS standard [the capacity change rate within ±10% at −25 to 85° C. (the reference temperature was 20° C.)] and the X5R characteristic [the capacitance change rate was within ±15% in −55 to 85° C.] even when it is composed of fine particles and the capacitor is made thinner, found that the object of the present invention can be attained by using barium titanate ingredient powder having the perovskite structure expressed by $ABO_3$ as ingredient powder wherein the rate A/B of A site components and B site components in the mole ratio is $1.006 \leq A/B \leq 1.035$ and the specific surface area is 8 to 50 $m^2/g$, and completed the present invention.

Namely, according to the present invention, there is provided a production method of a dielectric ceramic composition having a step of firing dielectric material including a main component ingredient and a subcomponent ingredient, wherein the subcomponent ingredient contains an oxide of Mg and/or a compound which becomes oxide of Mg after firing, at least one of oxides of Mn and Cr and/or compounds which become oxides of these after firing;

MgO is 0.1 to 3 moles and $MnO+Cr_2O_3$ is 0 to 0.5 mole (note that 0 is not included)

in terms of MgO, MnO and $Cr_2O_3$ with respect to 100 moles of the main component ingredient; and the main component ingredient before firing is barium titanate ingredient powder having the perovskite type crystal structure expressed by $ABO_3$, and having a ratio A/B of A site components and B site components of $1.006 \leq A/B \leq 1.035$ and the specific surface area of 8 to 50 $m^2/g$.

In the production method of a dielectric ceramic composition according to the present invention, the subcomponent ingredient contains one or more of oxides selected from V, W, Ta and Nb and/or compounds which become oxides of these after firing; and $V_2O_5+WO_3+Ta_2O_5+Nb_2O_5$ is 0 to 0.5 mole (note that 0 is not included) in terms of $V_2O_5$, $WO_3$, $Ta_2O_5$ and $Nb_2O_5$ with respect to 100 moles of the main component ingredient.

In the production method of a dielectric ceramic composition according to the present invention, the subcomponent ingredient further contains oxides of R (note that R is one or more selected from Sc, Er, Tm, Yb, Lu, Y, Dy, Ho, Th, Gd and Eu) and/or compounds which become the oxides of R after firing by an amount of 0 to 5 moles (note that 0 is not included) in terms of $R_2O_3$ with respect to 100 moles of the main component ingredient.

Furthermore preferably, the oxides of R and/or compounds which become the oxides of R are oxides of one or more selected from Y, Dy and Ho and/or compounds which become oxides of these after firing.

In the production method of a dielectric ceramic composition according to the present invention, the subcomponent ingredient further contains an oxide of Si and/or a compound which becomes oxide of Si after firing by an amount of 0.5 to 12 moles in terms of $SiO_2$ with respect to 100 moles of the main component ingredient.

In the production method of a dielectric ceramic composition according to the present invention, the subcomponents ingredient further contains at least two of oxides of Ba, Sr and Ca and/or compounds which become oxides of these after firing; and BaO+SrO+CaO is 0.5 to 12 moles in terms of BaO, SrO and CaO with respect to 100 moles of the main component ingredient.

In the production method of a dielectric ceramic composition according to the present invention, components of the A site contains one or more selected from Ba, Sr and Ca, and components of the B site contains Ti and/or Zr in the barium titanate ingredient powder.

A dielectric ceramic composition according to the present invention is a dielectric ceramic composition produced by the above method.

In the dielectric ceramic composition according to the present invention, an average particle diameter of dielectric particle after firing composing the dielectric ceramic composition is 0.2 μm or less.

An electronic device according to the present invention comprises a dielectric layer composed of the above explained dielectric ceramic composition. The electronic device is not particularly limited, but a multilayer ceramic capacitor, piezoelectric element, chip inductor, chip barrister, chip thermistor, chip resistance and other surface mounted chip type electronic devices may be mentioned as examples.

A multilayer ceramic capacitor according to the present invention comprises a capacitor element body wherein dielectric layers composed of the dielectric ceramic composition explained above and internal electrode layers are alternately stacked.

In the multilayer ceramic capacitor according to the present invention, a thickness of the dielectric layer is 4.5 μm or less, more preferably 3.0 μm or less.

According to the present invention, in a production method of a dielectric ceramic composition used as a dielectric layer of electronic devices, such as a multilayer ceramic capacitor, dielectric particles can be made finer without deteriorating other electric characteristics even when the multilayer ceramic capacitor is made thinner, and it is possible to provide a production method of a highly reliable dielectric ceramic composition having a preferable temperature characteristic to satisfy the B characteristic and the X5R characteristic, and an excellent high temperature load lifetime, and a dielectric ceramic composition able to be obtained by the production method.

Also, by using the dielectric ceramic composition obtained by the production method of the present invention, it is possible to provide a highly reliable electronic device, such as a multilayer ceramic capacitor, having a preferable temperature characteristic to satisfy the B characteristic and the X5R characteristic, and an excellent high temperature load lifetime even when the capacitor is made to be thinner and multilayer.

BRIEF DESCRIPTION OF DRAWINGS

These and other objects and features of the present invention will become clearer from the following description of the preferred embodiments given with reference to the attached drawings, in which:

FIG. 3 is a graph of a relationship of an A/B value of barium titanate ingredient powder and a high temperature load lifetime.

DESCRIPTION OF THE PREFERRED EMBODIMENT

Before explaining about a production method of a dielectric ceramic composition according to the present invention, a multilayer ceramic capacitor will be explained first.

Multilayer Ceramic Capacitor

Figure 1:
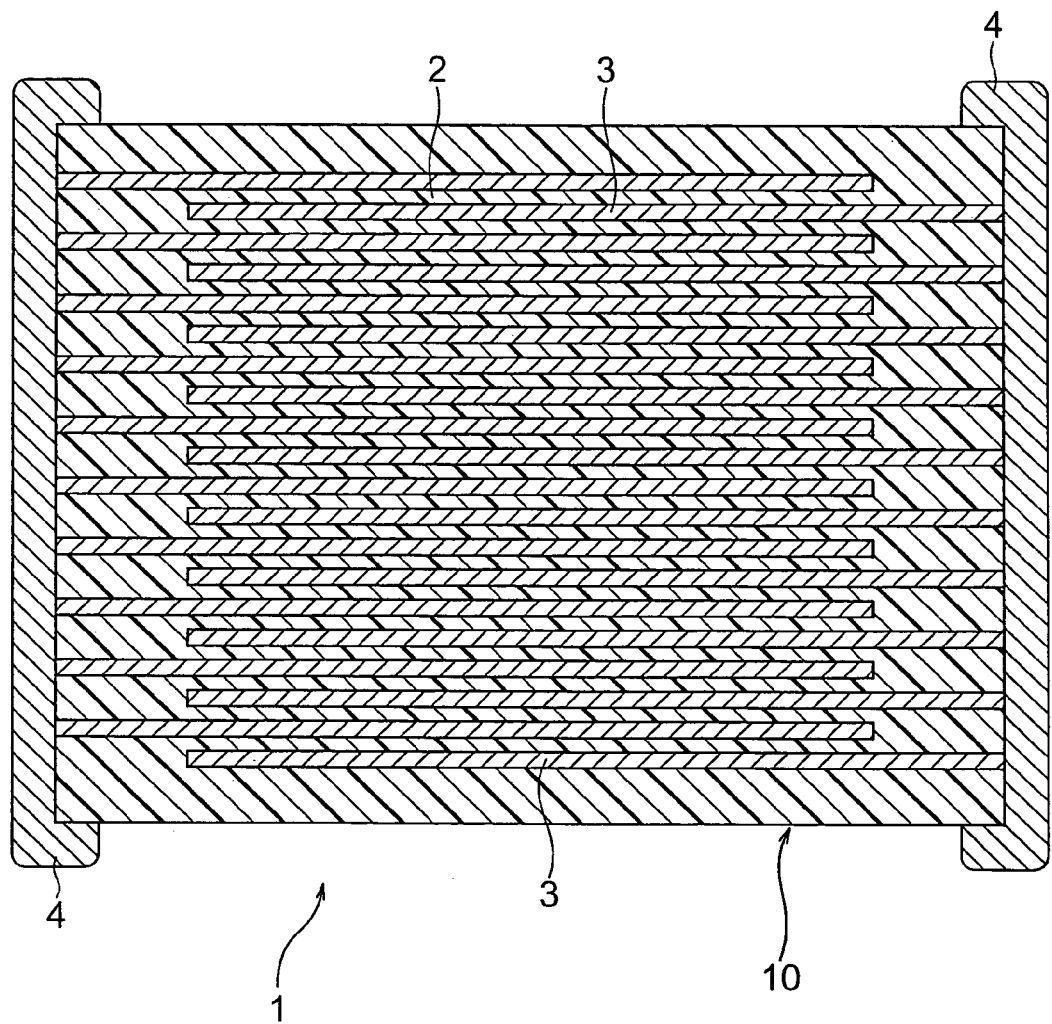
FIG. 1 is a cross-sectional view of a multilayer ceramic capacitor according to an embodiment of the present invention.

As shown in FIG. 1, a multilayer ceramic capacitor 1 according to an embodiment of the present invention comprises a capacitor element body 10 configured by alternately stacking dielectric layers 2 and internal electrode layers 3. At both end portions of the capacitor element body 10, a pair of external electrodes 4 respectively conductive with the internal electrode layers 3 arranged alternately inside the element body 10 are formed. A shape of the capacitor element body 10 is not particularly limited but normally is a rectangular parallelepiped shape. Also, the size is not particularly limited and may be a suitable size according to the use object, but normally is (0.4 to 5.6 mm)×(0.2 to 5.0 mm)×(0.2 to 1.9 mm) or so.

The internal electrode layers 3 are stacked, so that the respective end faces are exposed alternately to surfaces of mutually facing two end portions of the capacitor element body 10. The pair of external electrodes 4 are formed at both end portions of the capacitor element body 10 and connected to the exposed end faces of the alternately arranged internal electrode layers 3 to configure a capacitor circuit.

Dielectric Layer 2

The dielectric layers 2 include a dielectric ceramic composition obtained by the production method of the present invention.

The dielectric ceramic composition according to an embodiment of the present invention is composed of dielectric particles and the dielectric particles includes as a main component barium titanate and subcomponents.

The above subcomponents contains at least one of oxides of Mn and Cr, and preferably contains one or more of oxides of selected from V, W, Ta and Nb, oxides of R (note that the R is one or more selected from Sc, Er, Tm, Yb, Lu, Y, Dy, Ho, Tb, Gd and Eu), and at least two of oxides of Ba, Sr and Ca.

Also, the above oxides of R are particularly preferably oxides of one or more selected from Y, Dy and Ho.

An oxide of Mg has an effect of flattening the capacitance-temperature characteristic and an effect of suppressing grain growth and is 0.1 to 3 moles, preferably 0.5 to 2.0 moles in terms of MgO with respect to 100 moles of the main component. When the content of the Mg oxide is too small, abnormal grain growth is liable to be caused, while when too much, a temperature characteristic of a specific permittivity tends to decline.

Oxides of Mn and Cr have an effect of accelerating sintering, an effect of heightening the IR (insulation resistance), and an effect of improving a high temperature load lifetime, and preferably is 0 to 0.5 mole, more preferably 0 to 0.25 mole (note that "0" is not included) in terms of $(MnO+Cr_2O_3)$ with respect to 100 moles of the main component. When the content of the Mn and Cr oxides is too much, the specific permittivity tends to decline.

Oxides of V, W, Ta and Nb have an effect of improving a high temperature load lifetime, and preferably is 0 to 0.5 mole (note that "0" is not included), more preferably 0.01 to 0.1 mole in terms of $(V_2O_5+WO_3+Ta_2O_5+Nb_2O_5)$ with respect to 100 moles of the main component. When the content of the V oxide is too much, the IR tends to be remarkably deteriorated.

Oxides of R (note that R is one or more selected from Sc, Er, Tm, Yb, Lu, Y, Dy, Ho, Tb, Gd and Eu) has an effect of mainly improving a high temperature load lifetime, and preferably is 0 to 5 moles, more preferably 1.0 to 3.5 moles in terms of $R_2O_3$ with respect to 100 moles of the main component. When the content of the R oxide is too much, the sintering property tends to be remarkably deteriorated.

An oxide of Si serves as a sintering auxiliary, and preferably is 0.5 to 12 moles, more preferably 2.0 to 5.0 moles in terms of $SiO_2$ with respect to 100 moles of the main component. When the content of the Si oxide is too small, the sintering property tends to decline, while when too much, the specific permittivity tends to decline.

Oxides of Ba, Sr and Ca exhibit an effect of improving a temperature characteristic of electrostatic capacity, and preferably is 0.5 to 12 moles, more preferably 2.0 to 5.0 moles in terms of $(BaO+SrO+CaO)$ with respect to 100 moles of the main component. When the content of the Ba, Sr and Ca oxides is too small, abnormal grain growth is liable to be caused, while when too much, the sintering property declines and the specific permittivity tends to decline.

Note that the Si oxide and Ba, Sr and Ca oxides may be added in forms of composite oxides expressed by $(Ba, Sr)_xSiO_{2+x}$, $(Ba, Ca)_xSiO_{2+x}$, $(Sr, Ca)_xSiO_{2+x}$. Since the above composite oxides have a low melting point, the Si oxide and Ba, Sr and Ca oxides are preferably added in the above composite oxide forms. The "x" in the respective composition formulas is preferably 0.8 to 1.2 and more preferably 0.9 to 1.1. When the "x" is too small, that is when $SiO_2$ is too much, the specific permittivity tends to decline, while when the "x" is too large, the melting point tends to become higher to deteriorate the sintering property.

Note that in the present specification, the respective oxides composing the main component and subcomponents are expressed by a stoichiometric composition, but oxidization states of the respective oxides may be out of the stoichiometric composition. Note that the ratios of the respective subcomponents are obtained by converting to the oxides of the above stoichiometric composition from the metal amount contained in the oxides composing the respective subcomponents.

A thickness of the dielectric layer 2 per one layer is preferably 4.5 μm or less, more preferably 3.0 μm or less and particularly preferably 2.6 μm or less.

An average particle diameter of dielectric particles after firing included in the dielectric layer 2 is preferably 0.2 μm or less, more preferably 0.18 μm or less. The lower limit of the average particle diameter is not particularly limited, but normally is 0.02 μm or so. Since the dielectric particles after firing can be made finer according to the production method of the present invention, the average particle diameter of the dielectric particles can be made 0.2 μm or less and, furthermore, 0.18 μm or less.

Internal Electrode Layer 3

A conductive material contained in the internal electrode layers 3 is not particularly limited but an inexpensive base metal can be used because components of the dielectric layer 2 has reduction resistance. As the base metal used as the conductive material, Ni or a Ni alloy is preferable. As a Ni alloy, an alloy of at least one of element selected from Mn, Cr, Co, Cu and Al with Ni is preferable, wherein a content of Ni in the alloy is preferably 95 wt % or more. Note that in Ni or Ni alloy, P or other trace of various components may be contained by about 0.1 wt % or less. A thickness of the internal electrode layer 3 may be suitably determined in accordance with the use object, etc., but normally is 0.05 to 3 μm, and particularly preferably 0.1 to 2.0 μm or so.

External Electrode 4

A conductive material included in the external electrodes 4 is not particularly limited, and inexpensive Ni and Cu, alloys of these may be used in the present invention. A thickness of the external electrode 4 may be suitably determined in accordance with the use object, etc. but normally 10 to 50 μm or so is preferable.

Production Method of Multilayer Ceramic Capacitor The multilayer ceramic capacitor 1 of the present invention produced by using the production method of a dielectric ceramic composition according to the present invention is produced by producing a green chip by a normal printing method or sheet method using a paste, firing the same, printing or transferring external electrodes, and firing. Below, the production method will be specifically explained.

First, dielectric material to be contained in the dielectric layer paste is prepared, and made the same to be paint to produce a dielectric layer paste. The dielectric layer paste may be an organic based paint obtained by kneading the dielectric material and organic vehicle or may be a water base paint.

In the present embodiment, the dielectric material contains a main ingredient and subcomponent ingredient, and barium titanate ingredient powder is used as the main component material.

The barium titanate ingredient powder has the perovskite type crystal structure expressed by $ABO_3$, wherein a value obtained by dividing the number of moles of components of the A site in the composition formula $ABO_3$ by the number of moles of components of the B site, that is a value of A/B is $1.006 \leq A/B \leq 1.035$, preferably $1.006 \leq A/B \leq 1.02$, and more preferably $1.006 \leq A/B \leq 1.009$. When the value of A/B is too small, it is liable that grain growth is caused and the high temperature load lifetime declines, while when the value of A/B is too large, it is liable that the sintering property declines and sintering becomes difficult.

Furthermore, the specific surface area of the barium titanate ingredient powder is 8 to 50 m²/g, preferably 10 to 50 m²/g, and furthermore preferably 15 to 50 m²/g. When the specific surface area is too small, it is liable that dielectric particles after firing become hard to be finer. While when the specific surface area is too large, the material powder becomes extremely fine and dispersion of the material powder becomes extremely difficult to cause a dispersion defective in production, which tends to bring deterioration of capacitor performance.

A characteristic of the present invention is the point that, as the barium titanate ingredient powder as a main raw component, a ingredient powder having the perovskite type crystal structure expressed by $ABO_3$, wherein the mole ratio value of A/B as the ratio of A site components and B site components in the composition formula $ABO_3$ is in the above range, and the specific surface area is in the above range is used. By using barium titanate ingredient powder as above as the main component ingredient, sub components are not required to be added by a large amount, so that dielectric particles after firing can be made finer without deteriorating other electric characteristics. Therefore, even when the dielectric layer is made thinner, it is possible to obtain a highly reliable multilayer ceramic capacitor having a preferable temperature characteristic to satisfy the B characteristics and the X5R characteristic, and particularly excellent high temperature load lifetime.

As components of the A site, one or more selected from Ba, Sr and Ca are preferably contained and, more preferably, Ba and/or Sr is contained.

As components of the B site, Ti and/or Zr is preferably contained and, more preferably, Ti is contained.

Note that a measurement of the A/B value in the composition formula $ABO_3$ can be made by the X-ray fluorescence analyzing and the IPC analysis, etc. In the X-ray fluorescence analyzing, by detecting a characteristic X-ray of respective constituent elements generated by irradiating an X-ray to the barium titanate ingredient powder, the abundance ratio of the respective composition existing in the material powder can be measured by the weight ratio. Then, the number of mole of each element is calculated from the weight ratio of the respective composition, and the number of mole of elements (for example, Ba, Sr and Ca) included in the A site is divided by the number of mole of elements (for example, Ti and Zr) included in the B site, so that the A/B value can be obtained.

A production method of the barium titanate ingredient powder is not particularly limited, but it can be produced, for example, by the solid-phase method, oxalates method, hydrothermal synthesis method, alkoxide method, sol-gel process, etc.

As subcomponent ingredients, oxides of the above elements and/or compounds which become these oxides after firing are preferably included, the content is preferably within the range explained above.

Also, preliminary firing may be performed on the dielectric materials, so that at least a part of the main component ingredient and the subcomponent ingredients is brought to react before firing.

Preliminary firing conditions are not particularly limited, but it is preferable that the temperature rising rate is 50 to 400° C./hour, the holding temperature is 700 to 1100° C., the temperature holding time is 0.5 to 6 hours, and the preliminary firing atmosphere is in the air or nitrogen.

Note that as the dielectric ingredient composed of the main component ingredient and subcomponent ingredient, the above explained oxides, mixtures thereof, and composite oxides of these may be used. Other than that, it is also possible to suitably select from a variety of compounds which becomes the above oxides and composite oxides by firing, such as carbonate, oxalate, nitrate, hydroxide, and organic metal compounds, etc. and mix for use. A content of each compound in the dielectric material may be determined so as to be the above composition of dielectric ceramic composition after firing. The particle diameter of the dielectric material in a state before being made to be a paint is normally 0.02 to 0.15 μm or so in an average particle diameter.

An organic vehicle is obtained by dissolving a binder in an organic solvent. The binder to be used for the organic vehicle is not particularly limited, and may be suitably selected from a normal variety of binders, such as ethyl cellulose, polyvinyl butyral. Also, the organic solvent to be used is not particularly limited and may be suitably selected from a variety of organic solvent, such as terpineol, butyl carbitol, acetone, toluene, in accordance with the using method, such as a printing method and sheet method.

Also, when a dielectric layer paste is made to be a water base paint, a water base vehicle obtained by dissolving a water-soluble binder or dispersant, etc. in water may be kneaded with the dielectric material. The water-soluble binder used for the wafer base vehicle is not particularly limited and, for example, polyvinyl alcohol, cellulose, a water-soluble acrylic resin, etc. may be used.

An internal electrode layer paste is prepared by kneading a conductive material made by the above variety of conductive metals and alloys, a variety of oxides to be the above conductive materials after firing, organic metal compounds, or resinates, etc. with the above organic vehicles.

The external electrode paste may be prepared in the same way as the above internal electrode layer paste.

A content of the organic vehicle in the above pastes is not particularly limited and may be a normal content of, for example, 1 to 5 wt % or so of the binder and 10 to 50 wt % or so of the solvent. Also, each paste may contain additives selected from a variety of dispersants, plasticizers, dielectrics, insulators, etc. in accordance with need. The total content thereof is preferably 10 wt % or less.

When using a printing method, the dielectric layer paste and the internal electrode layer paste are stacked by printing on a substrate, such as PET, cut to a predetermined shape, then, peeled from the substrate to obtain a green chip.

When using a sheet method, a dielectric layer paste is used for forming a green sheet, an internal electrode layer paste is printed thereon, then, the results are stacked to obtain a green chip.

The green chip is subjected to binder removal processing before firing. The conditions of binder removal processing may be suitably determined in accordance with a kind of the conductive material and the binder in the dielectric paste and the internal electrode layer paste. The oxygen partial pressure in the binder removal atmosphere is preferably $10^{-45}$ to $10^5$ Pa. When the oxygen partial pressure is less than the above range, the binder removal effect is declined. While when it exceeds the above range, the internal electrode layer tends to be oxidized.

Also, as binder removal conditions other than the oxygen partial pressure, the temperature rising rate is preferably 5 to 300° C./hour, more preferably 10 to 100° C./hour, the holding temperature is preferably 180 to 400° C., more preferably 200 to 350° C., and the temperature holding time is preferably 0.5 to 24 hours, more preferably 2 to 20 hours. Also, the firing atmosphere is preferably in the air or in a reducing atmosphere. As an atmosphere gas in the reducing atmosphere, for example, a wet mixed gas of $N_2$ and $H_2$ is preferable.

The atmosphere of firing the green chip may be suitably determined in accordance with a kind of a conductive material in the internal electrode layer paste, etc. The oxygen partial pressure in the firing atmosphere is preferably $10^{-9}$ to $10^{-4}$ Pa when using Ni, a Ni alloy or other base metal as the conductive material. When the oxygen partial pressure is less than the above range, the conductive material in the internal electrode-layer may be abnormally sintered and broken in some cases. Also, when it exceeds the above range, the internal electrode layer tends to be oxidized.

The holding temperature at firing is preferably 1000 to 1400° C. and more preferably 1100 to 1350° C. When the holding temperature is less than the above range, densification becomes insufficient, while when it exceeds the above range, breaking of electrodes due to abnormal sintering of the internal electrode layer, deterioration of the capacitance-temperature characteristic due to dispersion of the internal electrode layer components, and reducing and abnormal grain growth of the dielectric ceramic composition are liable to be caused.

Other firing conditions than the above are: the temperature rising rate is preferably 50 to 500° C./hour, more preferably 100 to 300° C./hour, the temperature holding time is preferably 0.5 to 8 hours, more preferably 1 to 3 hours, and the cooling rate is preferably 50 to 500° C./hour, more preferably 100 to 300° C./hour. Also, the firing atmosphere is preferably a reducing atmosphere, and a wet mixed gas of $N_2$ and $H_2$ is preferably used as the atmosphere gas.

When firing in a reducing atmosphere, annealing is preferably performed on the capacitor element body. Annealing is processing for re-oxidizing the dielectric layer, and thereby, the electric characteristics, particularly a high temperature load lifetime can be remarkably enhanced.

The oxygen partial pressure in the annealing atmosphere is preferably $10^{-3}$ Pa or more, particularly $10^{-2}$ to 10 Pa. When the oxygen partial pressure is less than the above range, re-oxidization of the dielectric layer becomes difficult, while when it exceeds the above range, the internal electrode layer tends to be oxidized.

The holding temperature at annealing is preferably 1100° C. or less, and particularly preferably 500 to 1100° C. When the holding temperature is less than the above range, oxidization of the dielectric layer becomes insufficient, so that the IR becomes low and particularly the high temperature load lifetime is liable to be short. On the other hand, when the holding temperature exceeds the above range, not only the internal electrode layer is oxidized to lower the capacitance, but the internal electrode layer undesirably reacts with the dielectric, so that deterioration of the capacitance-temperature characteristic, deterioration of the IR, and deterioration of the high temperature load lifetime are easily caused. Note that the annealing may be composed only of a temperature rising step and a temperature lowering step. Namely, the temperature holding time may be 0. In this case, the holding temperature indicates the highest temperature.

As other annealing conditions, the temperature holding time is preferably 0 to 20 hours, more preferably 2 to 10 hours, and the cooling rate is preferably 50 to 500° C./hour, more preferably 100 to 300° C./hour. Also, as an atmosphere of the annealing, for example, a wet $N_2$ gas, etc. is preferably used.

In the above binder removal processing, firing and annealing, to wet the $N_2$ gas or a mixed gas, etc., for example, a wetter, etc. may be used. In this case, the water temperature is preferably 5 to 75° C.

The binder removal processing, firing and annealing may be performed continuously or separately.

The capacitor element body obtained as explained above is subjected to end polishing, such as barrel polishing and sandblasting, applied, printed or transferred an external electrode paste, and subjected to firing to form external electrodes 4. Firing conditions of an external electrode paste are preferably, for example, at 300 to 800° C. for 10 minutes to 2 hours or so in a wet mixed gas of $N_2$ and $H_2$. A covering layer is formed by plating, etc. on surfaces of the external electrodes 4 in accordance with need.

The multilayer ceramic capacitor of the present invention produced as above is mounted on a print substrate, etc. by soldering, etc. and used for a variety of electronic devices, etc.

As explained above, an embodiment of the present invention was explained but the present invention is not at all limited to the above embodiment and may be variously modified within the scope of the present invention.

For example, in the above embodiments, a multilayer ceramic capacitor was taken as an example of electronic devices according to the present invention, but an electronic device according to the present invention is not limited to a multilayer ceramic capacitor and may be any as far as it includes a dielectric layer composed of a dielectric ceramic composition having the above composition.

EXAMPLES

Below, the present invention will be explained further in detail based on examples, but the present invention is not limited to the examples.

Example 1

As a main component material, barium titanate ingredient powder having the specific surface area and A/B as shown in Table 1 below was prepared.

The specific surface area of the barium titanate ingredient powder was measured by the nitrogen absorption method (BET method). Also, the A/B of the, barium titanate ingredient powder was obtained by measuring the weight ratio (abundance ratio) of a composition existing in the powder including impurities by using a fluorescence X-ray analysis device (3550 made by Rigaku Corporation) and converting the weight ratio to the mole ratio. Namely, number of mole of each element is calculated from the weight ratio of the each composition obtained by the measurement result, and the A/B value was calculated by dividing the number of mole of Ba, Sr and Ca as elements included in the A site by the number of moles of Ti and Zr as elements included in the B site.

Note that as a detailed result of fluorescent X-ray analysis, for example, the barium titanate ingredient powder used as a main component ingredient of an example sample 12 in Table 1 is BaO: 65.836 wt %
$TiO_2$: 34.114 wt %
$SiO_2$: 0.031 wt %
SrO: 0.017 wt %
$Al_2O_3$: 0.003 wt % and the A/B value was 1.006.

the A/B values in Table 1 were obtained by making the same measurement also on other samples.

Next, the main component ingredient was added with MgO, MnO, $V_2O_5$, $Y_2O_3$, (Ba, Ca) $SiO_3$ as subcomponent ingredients, subjected to wet mixing by a ball-mill for 16 hours and dried to obtain a dielectric material. Adding quantities of the respective subcomponent ingredients were 2 moles of MgO, 0.2 mole of MnO, 0.03 mole of $V_2O_5$, 2 moles of $Y_2O_3$ and 3 moles of (Ba, Ca) $SiO_3$ with respect to 100 moles of the main component ingredient.

The obtained dielectric material was added with a polyvinyl butyral resin and ethanol based organic solvent, mixed again with a ball-mill, and made to be a paste, so that a dielectric layer paste was obtained.

Next, 44.6 parts by weight of Ni particles, 52 parts by weight of terpineol, 3 parts by weight of ethyl cellulose, and 0.4 part by weight of benzotriazole were kneaded with a three-roll mill, and made to be a slurry to obtain an internal electrode layer paste.

By using the pastes, a multilayer ceramic chip capacitor shown in FIG. 1 was produced as explained below.

By using the obtained dielectric layer paste, a green sheet having a thickness of 3 μm was formed on a PET film by a doctor blade method. The internal electrode layer paste was printed thereon by a screen printing method, then, the sheet was peeled off from the PET film. After that, the green sheets and protective green sheets (those not printed with the internal electrode layer paste) were stacked and adhered by pressure to obtain a green chip.

Next, the green chip was cut to be a predetermined size, subjected to binder removal processing, firing and annealing under the conditions below, and a multilayer ceramic fired body was obtained. The binder removal processing conditions were the temperature rising rate of 32.5° C./hour, the holding temperature of 260° C., the temperature holding time of 8 hours, and the atmosphere was in the air. The firing conditions were the temperature rising rate of 200° C./hour, the holding temperature of 1200° C., the temperature holding time of 2 hours, the cooling rate of 200° C./hour and the atmosphere was in a wet mixed gas of $N_2+H_2$. The annealing conditions were the temperature rising rate of 200° C./hour, the holding temperature of 1050° C., the temperature holding time of 2 hours, the cooling rate of 200° C./hour and the atmosphere was in a wet $N_2$ gas. Note that a wetter with a water temperature of 20° C. was used for wetting the atmosphere gas at firing and annealing.

Next, end surface of the obtained multilayer ceramic fired body was polished by sandblast and applied with In—Ga as an external electrode, so that samples 1 to 18 of the multilayer ceramic capacitor shown in FIG. 1 were obtained.

Dimensions of the obtained capacitor samples were 3.2 mm×1.6 mm×0.6 mm, the number of dielectric layers sandwiched by internal electrode layers were 4, and a thickness of the internal electrode layer was 1.2 μm. Table 1 shows a thickness per one dielectric layer (interlayer thickness) and an average particle diameter of dielectric particles after firing of each sample.

As a measuring method of the thickness of the dielectric layer, first, the obtained capacitor sample was cut at a face perpendicular to the internal electrodes, the cut face was polished, and the polished face was observed by a metal microscope to obtain a thickness of the dielectric layer after sintering. Note that the thickness of the dielectric layer was an average value on 20 measurements points.

As a measuring method of the average particle diameter of the dielectric particles after firing, chemical etching was performed on the polished face, then, a scanning electron microscope (SEM) was used for observation, and calculation was conducted by a code method on an assumption that a shape of the dielectric particle was a sphere. Note that the average particle diameter was an average value on 250 measurement points.

The obtained capacitor samples were measured to obtain the short-circuiting defective rate, specific permittivity, high temperature load lifetime and temperature characteristic of electrostatic capacity by methods explained below.

Short-Circuiting Defective Rate

The short-circuiting defective rate was obtained by performing conduction check by a tester by using 80 capacitor samples. Those with a resistance value of 10 Ω or less were judged to be short-circuiting defective and the defective number was obtained, then, the percentage (%) with respect to the whole number was calculated. The lower the short-circuiting defective, the better. The results are shown in Table 1.

Specific Permittivity ($\epsilon_r$)

An electrostatic capacity C of the capacitor samples was measured under conditions of the reference temperature of 20° C., a frequency of 1 kHz, and an input signal level (measurement voltage) of 1 Vrms/μm by using a digital LCR meter (YHP4284 made by Yokogawa Electric Corporation). Then, the obtained electrostatic capacity was used for calculating the specific permittivity (there is no unit). The larger the specific permittivity, the better, and the specific permittivity is preferably 1000 or more in the present embodiment. The results are shown in Table 1.

High Temperature Load Lifetime

A high temperature load lifetime of the capacitor samples was measured by holding them in a state of being applied with a direct current voltage of 20 V/μm at 160° C. the high temperature load lifetime was measured on 10 capacitor samples and evaluated by measuring an average lifetime. As evaluation, time from the start of application until the point where the resistance was reduced by one digit was defined as a lifetime. The longer the lifetime, the more preferable, and the lifetime is preferably 30 hours or more in the present embodiment. The results are shown in Table 1.

Temperature Characteristic of Electrostatic Capacity

An electrostatic capacity was measured in a temperature range of −55 to 85° C. on the capacitor samples, and change rates $\Delta C_{-55}/C_{25}$, $\Delta C_{85}/C_{25}$ (the unit is %) of the electrostatic capacity at −55° C. and 85° C. with respect to that at +25° C. were calculated. The change rate $\Delta C_{85}/C_{25}$ of the electrostatic capacity at 85° C. of each sample is shown in Table 1. Also, the change rate $\Delta C_{-55}/C_{25}$ of the electrostatic capacity at −55° C. was within ±10% in any of the samples.

TABLE 1

| Sample No. | | Powder Characteristic of Barium Titanate Raw Material | | Chip Characteristic | | | Electric Characteristic | | |
|---|---|---|---|---|---|---|---|---|---|
| | | Specific Surface Area ($m^2$/g) | A/B | Thickness of Dielectric (μm) | Short-circuiting Defective Rate (%) | Average Particle Diameter (μm) | Specific Permittivity | High Temperature Load Lifetime (h) | $\Delta C_{85}/C_{25}$ (%) |
| 1 | Comparative Example | 9.10 | 0.989 | 2.4 | 5 | 0.302 | 2660 | 2.3 | −5.04 |
| 2 | Comparative Example | 19.00 | 0.993 | 2.4 | 4 | 0.318 | 2295 | 6 | −4.99 |
| 3 | Comparative Example | 9.80 | 0.997 | 2.5 | 3 | 0.305 | 2342 | 5.5 | −6.30 |

TABLE 1-continued

| Sample No. | | Powder Characteristic of Barium Titanate Raw Material | | Chip Characteristic | | Electric Characteristic | | |
|---|---|---|---|---|---|---|---|---|
| | | Specific Surface Area (m²/g) | A/B | Thickness of Dielectric (μm) | Short-circuiting Defective Rate (%) | Average Particle Diameter (μm) | Specific Permittivity | High Temperature Load Lifetime (h) | Δ $C_{85}/C_{25}$ (%) |
| 4 | Comparative Example | 43.30 | 0.997 | 2.5 | 3 | 0.277 | 2111 | 13.3 | −6.10 |
| 5 | Comparative Example | 11.90 | 0.998 | 2.3 | 2 | 0.244 | 2285 | 10.1 | −7.01 |
| 6 | Comparative Example | 8.65 | 1.001 | 2.3 | 2 | 0.212 | 1701 | 15.9 | −7.33 |
| 7 | Comparative Example | 8.10 | 1.002 | 2.3 | 3 | 0.220 | 1575 | 18 | −7.81 |
| 8 | Comparative Example | 12.80 | 1.003 | 2.5 | 2 | 0.221 | 2003 | 23 | −7.54 |
| 9 | Comparative Example | 14.31 | 1.003 | 2.3 | 1 | 0.237 | 1976 | 9 | −7.98 |
| 10 | Comparative Example | 28.10 | 1.005 | 2.4 | 2 | 0.235 | 1420 | 16 | −8.77 |
| 11 | Comparative Example | 11.99 | 1.005 | 2.5 | 1 | 0.205 | 1694 | 21.3 | −8.23 |
| 12 | Example | 22.43 | 1.006 | 2.5 | 0 | 0.155 | 1290 | 42.9 | −8.01 |
| 13 | Example | 15.84 | 1.007 | 2.4 | 0 | 0.168 | 1350 | 55.1 | −8.53 |
| 14 | Example | 21.17 | 1.007 | 2.5 | 0 | 0.187 | 1413 | 84.1 | −9.08 |
| 15 | Example | 10.14 | 1.008 | 2.5 | 0 | 0.154 | 1065 | 80.9 | −9.35 |
| 16 | Example | 11.43 | 1.009 | 2.4 | 0 | 0.141 | 1106 | 99.4 | −9.62 |
| 17 | Comparative Example | 5.07 | 1.007 | 2.4 | 2 | 0.268 | 2190 | 15 | −7.70 |
| 18 | Comparative Example | 4.75 | 1.008 | 2.4 | 3 | 0.284 | 2130 | 7.8 | −6.70 |

Note that MgO is 2 moles, MnO is 0.2 mole, $Y_2O_3$ is 2 moles, $V_2O_5$ is 0.03 mole.

Table 1 shows powder characteristic of barium titanate material, chip characteristic and electric characteristic of capacitor samples 1 to 18 using barium titanate ingredient powder having different specific surface area and A/B. Also, FIG. 2 shows a graph of a relationship of the A/B value of barium titanate ingredient powder and an average particle diameter of dielectric particle after firing, and FIG. 3 shows graph of relationship of the A/B value of barium titanate ingredient powder and high temperature load lifetime.

Note that capacitor samples using barium titanate ingredient powder having an A/B value of exceeding 1.035 exhibited remarkable deterioration in sintering property, so that samples able to be measured various electric characteristics could not be obtained.

Also, capacitor samples using barium titanate ingredient powder having a specific surface area of exceeding 50 m²/g exhibited remarkable difficulty in dispersing material powder in production, so that samples able to be measured various electric characteristics could not be obtained.

Figure 2:
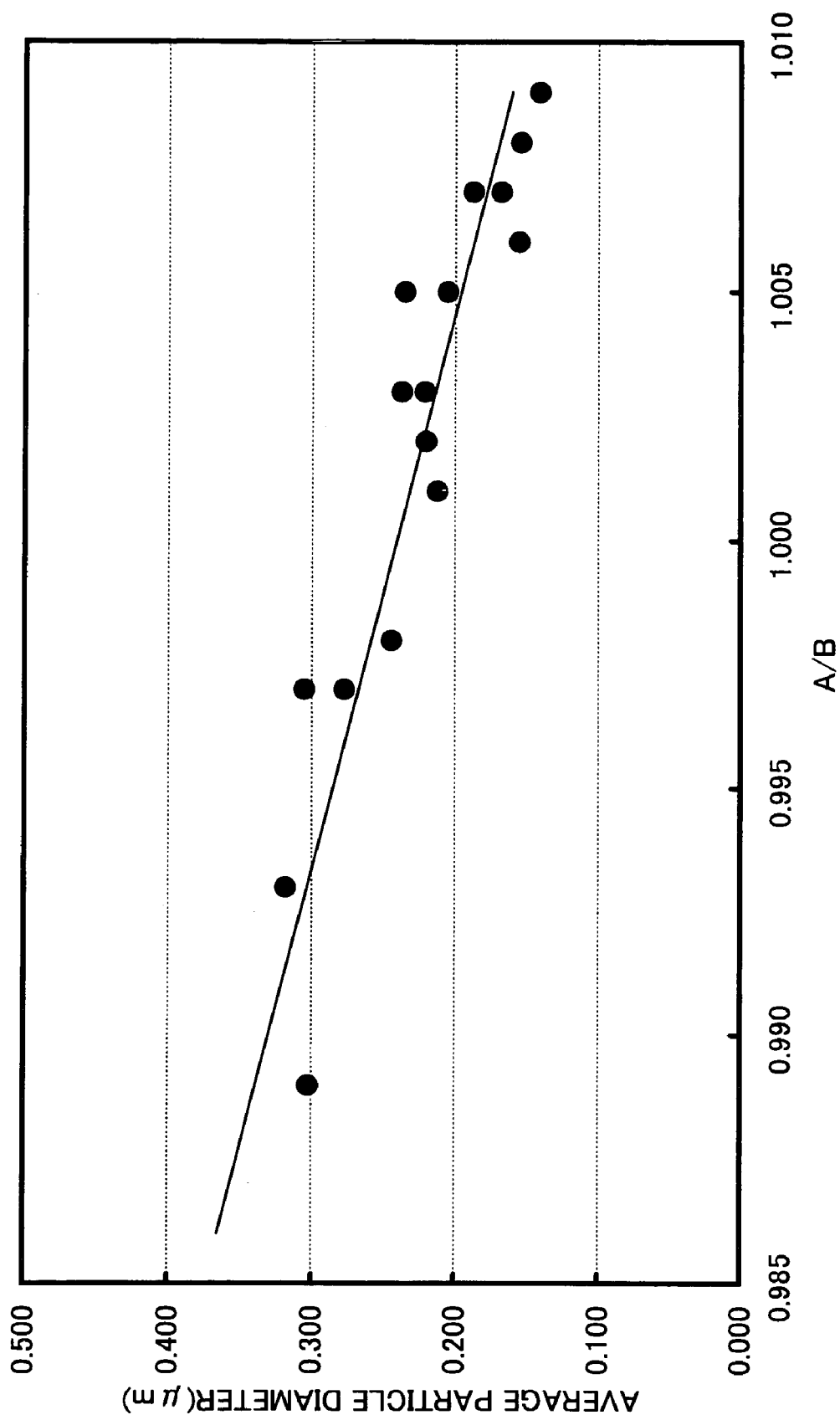
FIG. 2 is a graph of a relationship of an A/B value of barium titanate ingredient powder and an average particle diameter of dielectric particles after firing.

It was confirmed that when the A/B value of barium titanate ingredient powder increased, the average particle diameter tended to be smaller from Table 1 and FIG. 2. Also, in any of the example samples 12 to 16 having the A/B value of 1.006 or more, the average particle diameter became 0.2 μm or less and fine particle was obtained. On the other hand, in any of the comparative example samples 1 to 11 having the A/B value of less than 1.006, the average particle diameter became larger than 0.2 μm.

From Table 1 and FIG. 3, when the A/B value of barium titanate ingredient powder increased, the tendency that the temperature load lifetime became longer was confirmed. In any of the example samples 12 to 16 having the A/B value of 1.006 or more, the lifetime was enhanced to more than 40 hours, which was preferable result. On the other hand, any of the comparative example samples 1 to 11, the lifetime was 25 hours or less. Furthermore, as is obvious from Table 1, it is confirmed particularly when the A/B value becomes 1.006 or more, an effect of improving the high temperature load lifetime on changes of the A/B value becomes large.

Furthermore, the example samples 12 to 16 exhibited preferable results that the short-circuiting defective rate was 0%, the specific permittivity became 1000 or more, and the temperature characteristic was $\Delta C_{-55}/C_{25}$ and $\Delta C_{85}/C_{25}$ of within ±10%, which was a result of satisfying the B characteristic and the X5R characteristic.

From the above results, to obtain a multilayer ceramic capacitor having a low short-circuiting defective rate, preferable specific permittivity and temperature characteristic, and particularly excellent high temperature load lifetime, it was confirmed that the A/B value of barium titanate ingredient powder as the main component was preferably made to be 1.006≦A/B≦1.035 and preferably 1.006≦A/B≦1.020.

Although the comparative example samples 17 and 18 using barium titanate ingredient powder having a specific surface area of less than 8 m²/g as the main component ingredient had the A/B value of 1.006≦A/B≦1.020, the results were that the average particle diameter became larger than 0.2 μm, the high temperature load lifetime became 15 hours or less, and the high temperature load lifetime characteristic was poor. From the results, it was confirmed that the specific surface area of barium titanate ingredient powder was preferably 8 to 50 m²/g.

Example 2

Except that the subcomponents expressed in Table 2 were used as the subcomponent ingredients, samples 19 to 26 of a multilayer ceramic capacitor were produced in the same way as in the example 1, and a thickness of the dielectric layer, short-circuiting defective rate, specific permittivity, high temperature load lifetime and temperature characteristic of electrostatic capacity were measured in the same way as in the example 1. Also, the specific surface area and the A/B value of barium titanate ingredient powder used in producing the capacitor samples 19 to 26 were also measured in the same way as in the example 1. The powder characteristic of barium titanate material, kinds and adding quantities of subcomponents, and chip characteristic and electric characteristics of the capacitor samples are shown in Table 2 and Table 3.

TABLE 2

| Sample No. | | Powder Characteristic of Barium Titanate Raw Material | | Subcomponent | | | | | | | | | |
|---|---|---|---|---|---|---|---|---|---|---|---|---|---|
| | | Specific Surface Area (m²/g) | A/B | Compound | Adding Quantity (mol) | Compound | Adding Quantity (mol) | Compound | Adding Quantity (mol) | Compound | Adding Quantity (mol) | Compound | Adding Quantity (mol) |
| 14 | Example | 21.17 | 1.007 | MgO | 2 | MnO | 0.2 | $Y_2O_3$ | 2 | $V_2O_5$ | 0.03 | $(Ba,Ca)SiO_3$ | 3 |
| 19 | Example | 21.22 | 1.007 | MgO | 2 | $Cr_2O_3$ | 0.2 | $Y_2O_3$ | 2 | $V_2O_5$ | 0.03 | $(Ba,Ca)SiO_3$ | 3 |
| 20 | Example | 22.20 | 1.007 | MgO | 2 | MnO | 0.2 | $Y_2O_3$ | 2 | $WO_3$ | 0.03 | $(Ba,Ca)SiO_3$ | 3 |
| 21 | Example | 21.46 | 1.007 | MgO | 2 | MnO | 0.2 | $Y_2O_3$ | 2 | $Ta_2O_5$ | 0.03 | $(Ba,Ca)SiO_3$ | 3 |
| 22 | Example | 22.35 | 1.007 | MgO | 2 | MnO | 0.2 | $Y_2O_3$ | 2 | $Nb_2O_5$ | 0.03 | $(Ba,Ca)SiO_3$ | 3 |
| 23 | Example | 21.87 | 1.007 | MgO | 2 | MnO | 0.2 | $Dy_2O_3$ | 2 | $V_2O_5$ | 0.03 | $(Ba,Ca)SiO_3$ | 3 |
| 24 | Example | 20.99 | 1.007 | MgO | 2 | MnO | 0.2 | $Ho_2O_3$ | 2 | $V_2O_5$ | 0.03 | $(Ba,Ca)SiO_3$ | 3 |
| 25 | Example | 22.71 | 1.007 | MgO | 2 | MnO | 0.2 | $Y_2O_3$ | 2 | $V_2O_5$ | 0.03 | $(Ba,Sr)SiO_3$ | 3 |
| 26 | Example | 21.29 | 1.007 | MgO | 2 | MnO | 0.2 | $Y_2O_3$ | 2 | $V_2O_5$ | 0.03 | $(Sr,Ca)SiO_3$ | 3 |

TABLE 3

| Sample No. | | Powder Characteristic of Barium Titanate Raw Material | | Chip Characteristic | | | Electric Characteristic | | |
|---|---|---|---|---|---|---|---|---|---|
| | | Specific Surface Area (m²/g) | A/B | Thickness of Dielectric (μm) | Short-circuiting Defective Rate (%) | Average Particle Diameter (μm) | Specific Permittivity | High Temperature Load Lifetime (h) | $\Delta C_{85}/C_{25}$ (%) |
| 14 | Example | 21.17 | 1.007 | 2.5 | 0 | 0.187 | 1413 | 84.1 | −9.08 |
| 19 | Example | 21.22 | 1.007 | 2.5 | 0 | 0.182 | 1340 | 70.3 | −9.21 |
| 20 | Example | 22.20 | 1.007 | 2.3 | 0 | 0.200 | 1560 | 69.1 | −9.84 |
| 21 | Example | 21.46 | 1.007 | 2.6 | 0 | 0.176 | 1390 | 58.6 | −9.05 |
| 22 | Example | 22.35 | 1.007 | 2.5 | 0 | 0.182 | 1290 | 45.8 | −8.98 |
| 23 | Example | 21.87 | 1.007 | 2.4 | 0 | 0.193 | 1410 | 62.1 | −9.66 |
| 24 | Example | 20.99 | 1.007 | 2.5 | 0 | 0.178 | 1320 | 71.8 | −9.13 |
| 25 | Example | 22.71 | 1.007 | 2.3 | 0 | 0.200 | 1470 | 49.5 | −9.52 |
| 26 | Example | 21.29 | 1.007 | 2.6 | 0 | 0.191 | 1330 | 31.6 | −9.91 |

From Table 2 and Table 3, any of the samples exhibited preferable results that the short-circuiting defective rate was 0% and the specific permittivity was 1000 or more, furthermore, as the temperature characteristic, $\Delta C_{-55}/C_{25}$ and $\Delta C_{85}/C_{25}$ was within ±10%, which was a result of satisfying the B characteristic and the X5R characteristic. From the results, it was confirmed that even when the subcomponents to be used were the compounds shown in Table 2, the effects of the present invention could be obtained.

What is claimed is:

1. A production method of a dielectric ceramic composition having dielectric particles comprising:

preparing a dielectric material including a main component ingredient and a subcomponent ingredient; and firing said dielectric material, wherein said subcomponent ingredient contains an oxide of Mg and/or a compound which becomes oxide of Mg after firing, at least one of oxides of Mn and Cr and/or compounds which become oxides of these after firing, one or more of oxides selected from V, W, Ta, and Nb and/or compounds which become oxides of these after firing, oxides of R (note that R is one or more selected from Sc, Er, Tm, Yb, Lu, Y, Dy, Ho, Tb, Gd, and Eu) and/or compounds which become the oxides of R after firing, an oxide of Si and/or a compound which becomes oxide of Si after firing, and at least two of oxides of Ba, Sr, and Ca and/or compounds which become oxides of these after firing;

MgO is in an amount of 0.1 to 3 moles,

MnO+$Cr_2O_3$ is in an amount greater than 0 to 0.5 moles, $V_2O_5$+$WO_3$+$Ta_2O_5$+$Nb_2O_5$ is in an amount greater than 0 to 0.5 moles, $R_2O_3$ is in an amount greater than 0 to 5 moles, $SiO_2$ is in an amount of 0.5 to 12 moles, and BaO+SrO+CaO is in an amount of 0.5 to 12 moles, in terms of MgO, MnO, $Cr_2O_3$, $V_2O_5$, $WO_3$, $Ta_2O_5$, $Nb_2O_5$, $R_2O_3$, $SiO_2$, BaO, SrO, and CaO with respect to 100 moles of the main component ingredient; and said main component ingredient before firing is barium titanate ingredient powder having the perovskite type crystal structure expressed by $ABO_3$, and having a ratio A/B of A site components and B site components of $1.006 \leq A/B \leq 1.035$ and a specific surface area of 15 to 50 m²/g.

2. The production method of a dielectric ceramic composition as set forth claim 1, wherein:

said oxides of R and/or compounds which become the oxides of R are oxides of one or more selected from Y, Dy, and Ho and/or compounds which become oxides of these after firing.

3. The production method of a dielectric ceramic composition as set forth in claim 1, wherein: components of said A site contain Ba and one or more selected from Sr and Ca, and components of said B site contain Ti and optionally Zr in said barium titanate ingredient powder.

* * * * *